(12) United States Patent
Portig

(10) Patent No.: US 6,397,029 B1
(45) Date of Patent: May 28, 2002

(54) COUPLER FOR AN IMAGE-FORMING APPARATUS

(75) Inventor: Harald Portig, Versailles, KY (US)

(73) Assignee: Lexmark International, Inc, Lexington, KY (US)

( * ) Notice: Subject to any disclaimer, the term of this patent is extended or adjusted under 35 U.S.C. 154(b) by 0 days.

(21) Appl. No.: 09/760,316

(22) Filed: Jan. 11, 2001

(51) Int. Cl.$^7$ ................................................ G03G 15/00
(52) U.S. Cl. ...................................... 399/167; 399/116
(58) Field of Search ................................. 399/167, 159, 399/116, 117, 88, 90, 75; 361/225, 214

(56) References Cited

U.S. PATENT DOCUMENTS

| | | | |
|---|---|---|---|
| 4,922,297 A | 5/1990 | Kondo | 399/117 |
| 5,303,004 A | 4/1994 | Maruyama et al. | 399/75 |
| 5,610,701 A | 3/1997 | Terada et al. | 399/298 |
| 5,638,158 A | 6/1997 | Sanpe et al. | 394/174 |
| 5,669,046 A | 9/1997 | Yoshida et al. | 399/167 |
| 5,768,656 A | 6/1998 | Nagasue et al. | 399/75 |
| 5,768,658 A | 6/1998 | Watanabe et al. | 399/111 |
| 5,774,767 A | 6/1998 | Shibata et al. | 399/167 |
| 5,815,767 A | 9/1998 | Kutsuwada et al. | 399/25 |
| 5,845,175 A | 12/1998 | Kumar et al. | 399/111 |
| 5,881,342 A | 3/1999 | Makino et al. | 399/167 |
| 5,993,101 A * | 11/1999 | Kohno et al. | 399/116 X |
| 6,035,159 A * | 3/2000 | Azuma et al. | 399/167 X |
| 6,301,458 B1 * | 10/2001 | Mori et al. | 399/167 |

FOREIGN PATENT DOCUMENTS

| | | | |
|---|---|---|---|
| EP | 0 735 432 A1 | | 10/1996 |
| JP | 07-325445 | * | 12/1995 |
| JP | 08-146825 | * | 6/1996 |

* cited by examiner

Primary Examiner—Sophia S. Chen
(74) Attorney, Agent, or Firm—David D. Kalish; Cynthia S. Mitchell

(57) ABSTRACT

A coupler for transferring rotary motion from a drive gear to a photoconductive drum or ITM belt within an image forming apparatus. In one embodiment, the coupler includes a substantially cylindrical body having first and second ends having extensions extending outward for mating respectively with the drive gear and photoconductive drum. One surface of each of the extension may include a rounded drive surface. One end of the coupler may further include a wall that mounts against a dome extending outward from one of the drive gear or photoconductive drum. One of the drive gear or photoconductive drum may further include axially aligned ridges that are straddled by the coupler to allow for the coupler to axially slide and maintain contact with the photoconductive drum and drive gear even during misalignment.

24 Claims, 6 Drawing Sheets

COUPLER FOR AN IMAGE-FORMING APPARATUS

BACKGROUND OF THE INVENTION

The present invention relates generally to an image-forming apparatus and, more specifically, to a coupler that accurately transmits angular motion from the drive gears to a photoconductive drum of an image-forming apparatus.

Image forming devices including copiers, laser printers, facsimile machines, and the like, include a photoconductive drum (hereinafter referred to as drum) having a rigid cylindrical surface that is coated along a defined length of its outer surface. The surface of the drum is charged to a uniform electrical potential and then selectively exposed to light in a pattern corresponding to an original image. Those areas of the photoconductive surface exposed to light are discharged thus forming a latent electrostatic image on the photoconductive surface. A developer material, such as toner, having an electrical charge such that the toner is attracted to the photoconductive surface is brought into contact with the photoconductive surface. A recording sheet, such as a blank sheet of paper, is then brought into contact with the photoconductive surface and the toner thereon is transferred to the recording sheet in the form of the latent electrostatic image. The recording sheet is then heated thereby permanently fusing the toner to it. In preparation for the next image forming cycle, the residual toner is removed from the photoconductive surface.

Combining the drum and toner container into an integral process cartridge mounted in the image forming apparatus is commonly established in the art and provides key advantages. Because toner is consumed in the image forming process, it must be replenished periodically. The drum also wears in the imaging forming process and, with wear, the quality of the formed image deteriorates. Therefore, the drum also must be replaced at defined intervals. Incorporating both the drum and toner supply into a process cartridge allows the end user to replace both toner and drum by removing the old process cartridge from the image forming apparatus and replacing it with a new one.

Precise positioning of the drum with respect to the body of the image forming apparatus is critical for good image quality. Particularly in a color image forming apparatus wherein a plurality of process cartridges are used, positioning between each of the drums with respect to each other, and positioning of all the drums with respect to the body of the image forming apparatus is critical to achieving good image quality.

In many image-forming apparatus, a drive train is permanently mounted and includes a last drive gear that couples to a gear permanently attached to the drum. In one embodiment, the drum gear has a large base diameter several times larger than the diameter of the drum to produce accurate movement since the angular error in the position of the drum would be proportional to displacement errors caused by tooth imperfections and pitch errors and inversely proportional to the base diameter. However, on a cartridge removable by the end user of the machine, the size of the gear permanently mounted to the drum is limited approximately to the drum diameter because otherwise the shape or size of the cartridge would be unwieldy. Therefore, to use a large gear as a final gear in the drum drive train, this gear has to be permanently mounted in the machine, not the removable cartridge. This gear then has to be connected effectively to the removable drum for operation by some kind of coupler.

Because the drum is part of the removable cartridge, the drum may not align with the drive gear when the cartridge is inserted into the image forming apparatus. In particular, the effective axes of rotation of the drum and gear may not be quite parallel to each other, and they may be offset radially by amounts that vary from machine to machine. The coupler should be able to provide accurate rotary motion from the drive gear to the drum despite such misalignments. Also because the drum is removable, the coupler has to disconnect from the drum and reconnect to the drum when the drum is removed and replaced, respectively.

Thus, there exists a need to transmit rotary motion accurately from the drive gear of the image forming apparatus to the drum even when the axes of rotation of the two are misaligned, and this connection has to be broken and reestablished for drum replacement.

SUMMARY OF THE INVENTION

The present invention is directed to a coupler for transmitting rotary motion from a drive gear within an image forming apparatus to a driven member, such as a photoconductive drum or an ITM belt drive roller. The coupler provides for accurate transmission of motion, even when the axes of the gear and driven member do not align.

The coupler includes a substantially hollow, elongated body having a first end and a second end. A number of flanges extend from the first end for contacting the drive gear, and prongs extend from the second end for contacting the drum. A biasing member is positioned within the hollow interior section for biasing the coupler from the gear toward the drum.

The invention further includes an image forming apparatus having a main image forming body with a drive gear having a central opening and ridges extending axially along the central opening. A photoconductive drum is mounted within the body and has a substantially cylindrical shape with an end cap on a first end with surfaces to receive drive motion from the coupler. The photoconductive drum is mounted within the body such that the drum end cap is positioned adjacent to the drive gear. A coupler extends between the body drive ridges and the drum end cap and includes a biasing member for maintaining the coupler between the photoconductive drum and the main image forming body.

The drum may include a dome positioned at a middle point of the drum end cap and extending outward for contacting the coupler and maintaining axial location between the drum end cap and body drive spokes. The end of the coupler adjacent the dome may include a contoured edge for aligning the coupler relative to the dome and drum end cap while the drum is inserted into the machine.

Additionally, the same kind of coupler may be used for transmitting rotary motion from a drive gear within an image forming apparatus to an intermediate transfer medium drive roller or gear. The coupler has a similar shape to that previously described and extends between a drive gear within the image forming apparatus and an intermediate transfer medium roller or gear on a removable intermediate transfer medium module.

DETAILED DESCRIPTION OF THE PREFERRED EMBODIMENTS

Figure 1:
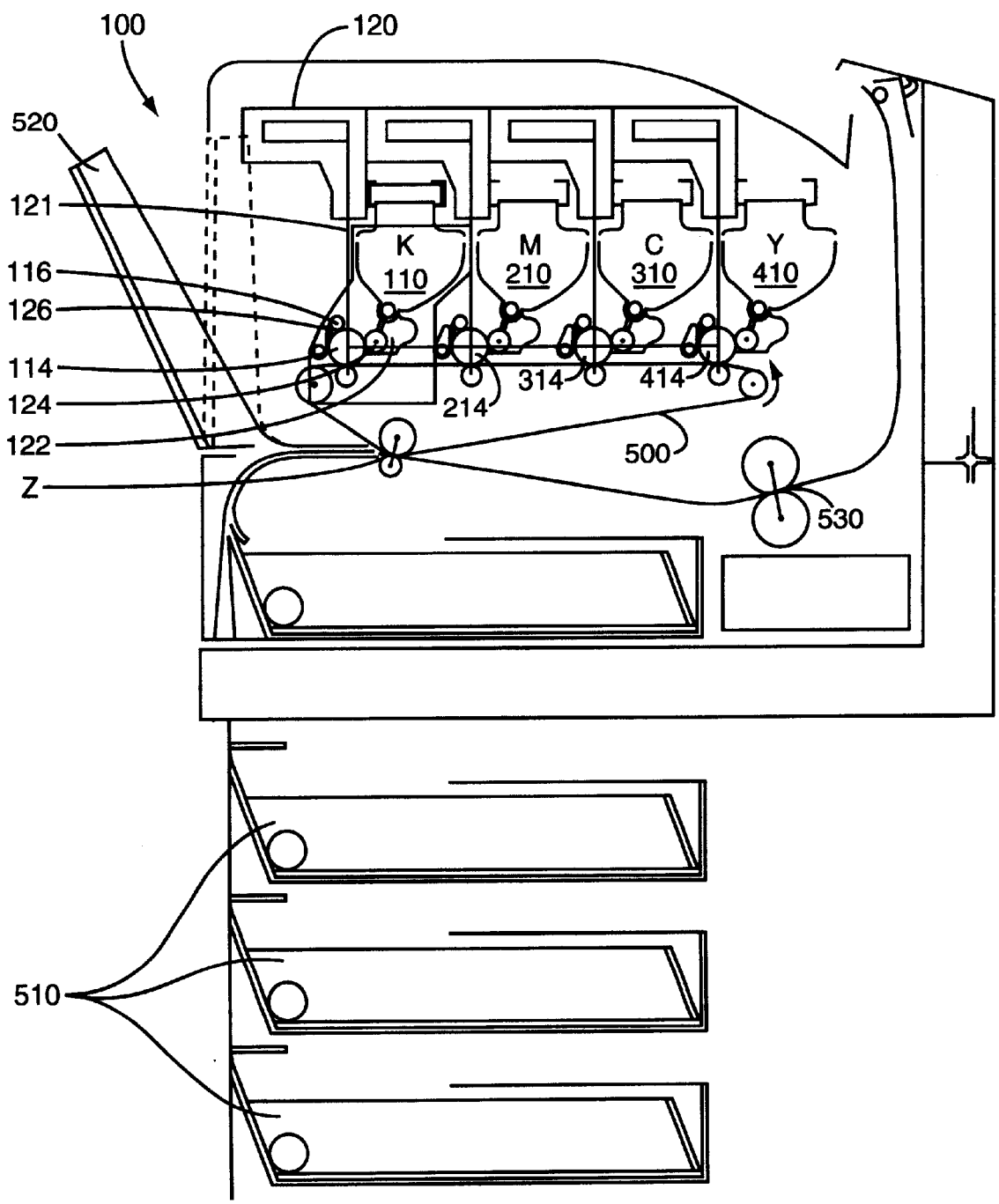
FIG. 1 is a cutaway side view of the internal mechanisms of an image-forming apparatus.

FIG. 1 illustrates the basic elements of an image forming device and is incorporated for an understanding of the overall electrophotographic image forming process. A color laser printer is illustrated as 100, however, one skilled in the art will understand that the present invention is applicable to other types of image forming devices. The image forming apparatus, generally designated 100, includes a plurality of similar toner cartridges 110, 210, 310, and 410. Each toner cartridge has similar construction but is distinguished by the toner color contained therein. In one embodiment, the device includes a black cartridge 110, a magenta cartridge 210, a cyan cartridge 310, and a yellow cartridge 410. The different color toners form individual images of a single color that are combined in layered fashion to create the final multicolored image.

Figure 6:
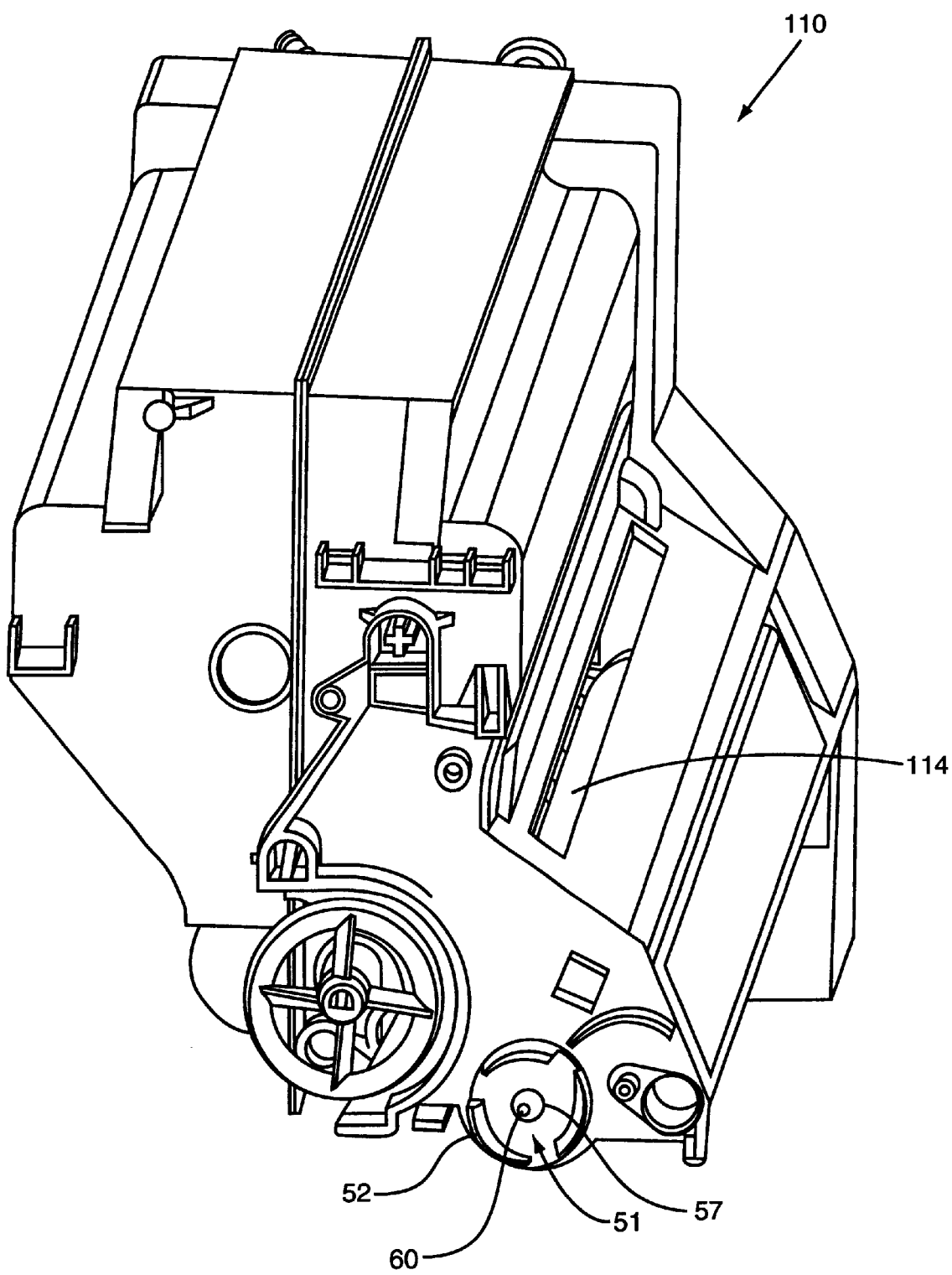
FIG. 6 is a rear perspective view of the cartridge that is removably mounted within the image forming apparatus.

Each of the toner cartridges is substantially identical and includes a developer housing, a drum 114, and a cleaning device. FIG. 6 illustrates a rear view of the cartridge 110 having the drum 114 mounted therein. As the cartridges are respectively identical except for the toner color, the cartridge and elements for forming black images will be described, with the other color image forming units being omitted for simplification.

Drum 114 is generally cylindrically-shaped with one end having a means for coupling with the image forming device drive gears to provide for rotational movement. The drum 114 has a smooth surface for receiving an electrostatic charge over the surface as the drum 114 rotates past charging roller 116. The drum 114 continuously and uniformly rotates past a laser scanning assembly 120 that directs a laser beam 121 onto selected portions of the drum surface forming an electrostatic latent image representing the image to be printed. A drive gear 30 rotates the drum at a constant speed as the laser beam 121 is scanned across its length. This process continues as the entire image is formed on the drum surface.

After receiving the latent image, the drum 114 rotates past a toner area having a toner bin 122 for housing the toner and a developer roller 124 for uniformly transferring toner to the drum 114. The toner may also be charged to assist in the transfer to the paper. The toner is a fine powder usually composed of plastic granules that are attracted and cling to the electrostatic latent image formed on the drum surface by the laser scanning assembly 120.

The drum 114 next rotates past an adjacently-positioned intermediate transfer medium belt 500 (hereinafter, ITM belt) to which the toner is transferred from drum 114. As illustrated in FIG. 1, the ITM belt 500 is endless and extends around a series of rollers adjacent to the drums. The ITM belt 500 and the image on each drum 114, 214, 314, 414 are synchronized providing for the toner from each drum to precisely align on the ITM belt during a single pass. By way of example as viewed in FIG. 1, the yellow (Y) toner will be placed on the ITM belt, followed by cyan (C), magenta (M), and black (K). After depositing the toner on the ITM belt, the drum 114 rotates through a cleaning area where residual toner is removed from the surface via a brush or scraper 126.

As the drums are being charged and gathering toner, a recording sheet, such as blank sheet of paper, is being routed to intercept the ITM belt 500. The paper may be placed in one of the lower trays 510, or introduced into the image forming device through a side track tray 520. A series of rollers and/or belts transports the paper to point Z where the sheet contacts the ITM belt 500 and receives the toner. Preferably, voltage is applied to the roller that pushes the sheet of paper against the ITM belt 500 at point Z to pull the charged toner away from the belt 500 and onto the paper. The sheet and attached toner next travel through a fuser 530 having a pair of rollers and a heating element that heats and fuses the toner to the sheet. The paper with fused image is then transported out of the image forming apparatus.

Each of the toner cartridges may be removed and replaced within the image forming apparatus. Replacement is usually necessary when there is no toner remaining within the cartridge. In one embodiment illustrated in FIG. 1, the cartridges are loaded into the image forming device in a direction substantially parallel to the axes of rotation of the drums. It is important that the coupler 10 provide for accurate drum rotation relative to the drive gears because the rotation of the drums is synchronized along with the rotation of the drums relative to the ITM belt 500. Print errors such as poor registration in which the different colors do not precisely overlay may occur if the drum rotation does not coincide with the movement of the drive gears, among many other possible reasons.

The coupler 10 transmits rotary motion between the drive gear 30 and the drum 114 to accurately control the angular position of the drum. The drive gear 30 is permanently mounted within the image forming apparatus and the coupler 10 is a link to transmit the accurate angular motion to the drum 114. The coupler 10 preferably has a high torsional stiffness because the torque necessary to drive the drum 114 is not constant at all times. Variations in torque may be caused by friction between elements such as the developer roller 124 or scraper 126 touching the drum 114 during rotation, the amount of toner coverage on the drum 114, irregularities in the surface textures of the contacting components, and others. In one embodiment, the coupler 10 is a one-piece construction that is zinc die cast for torsional stiffness.

Figure 2:
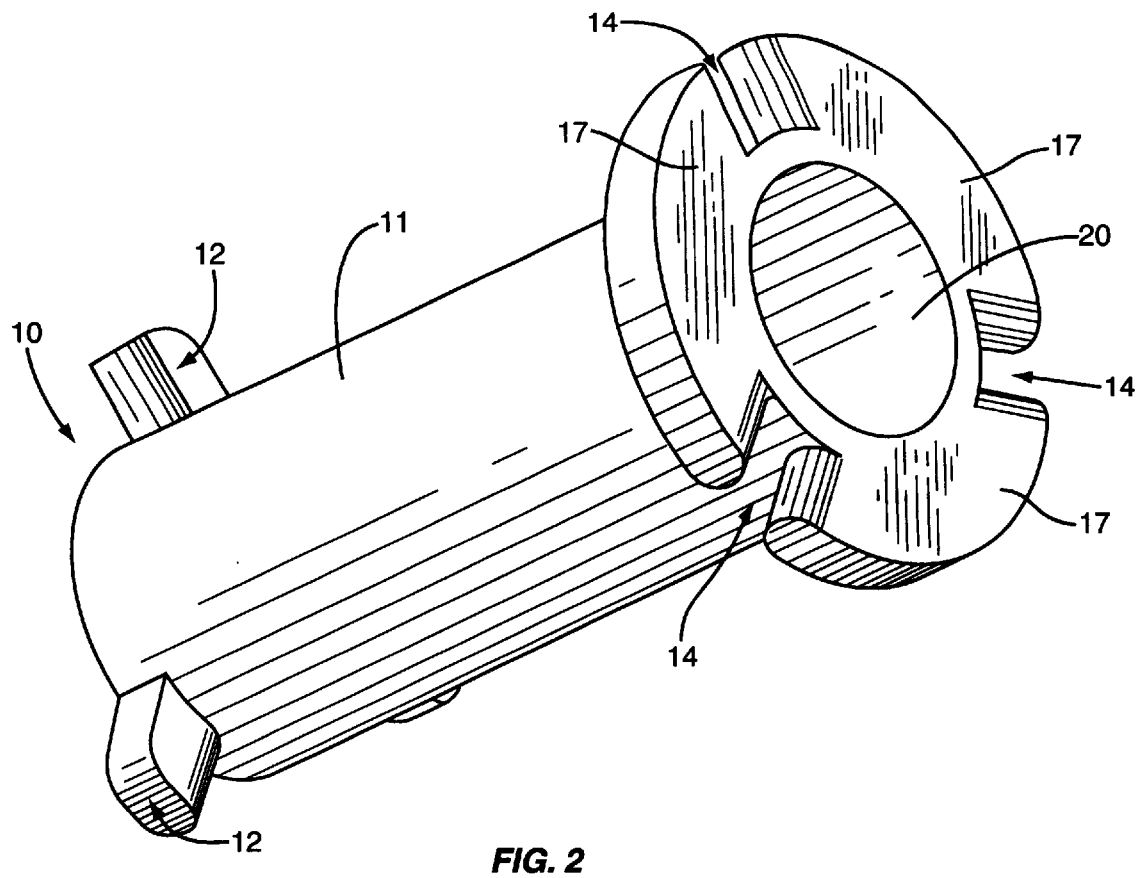
FIG. 2 is a first perspective view of the coupler constructed according to one embodiment of the present invention.
Figure 3:
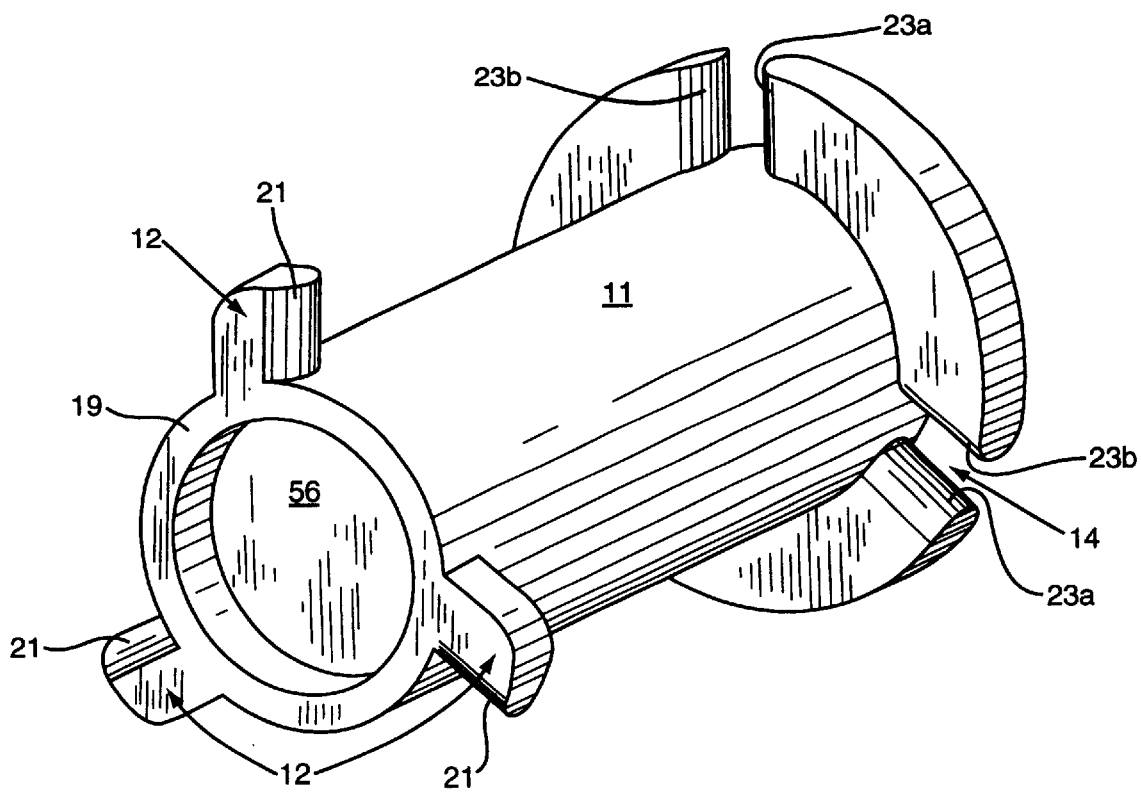
FIG. 3 is a second perspective view of the coupler of FIG. 2.
Figure 4:
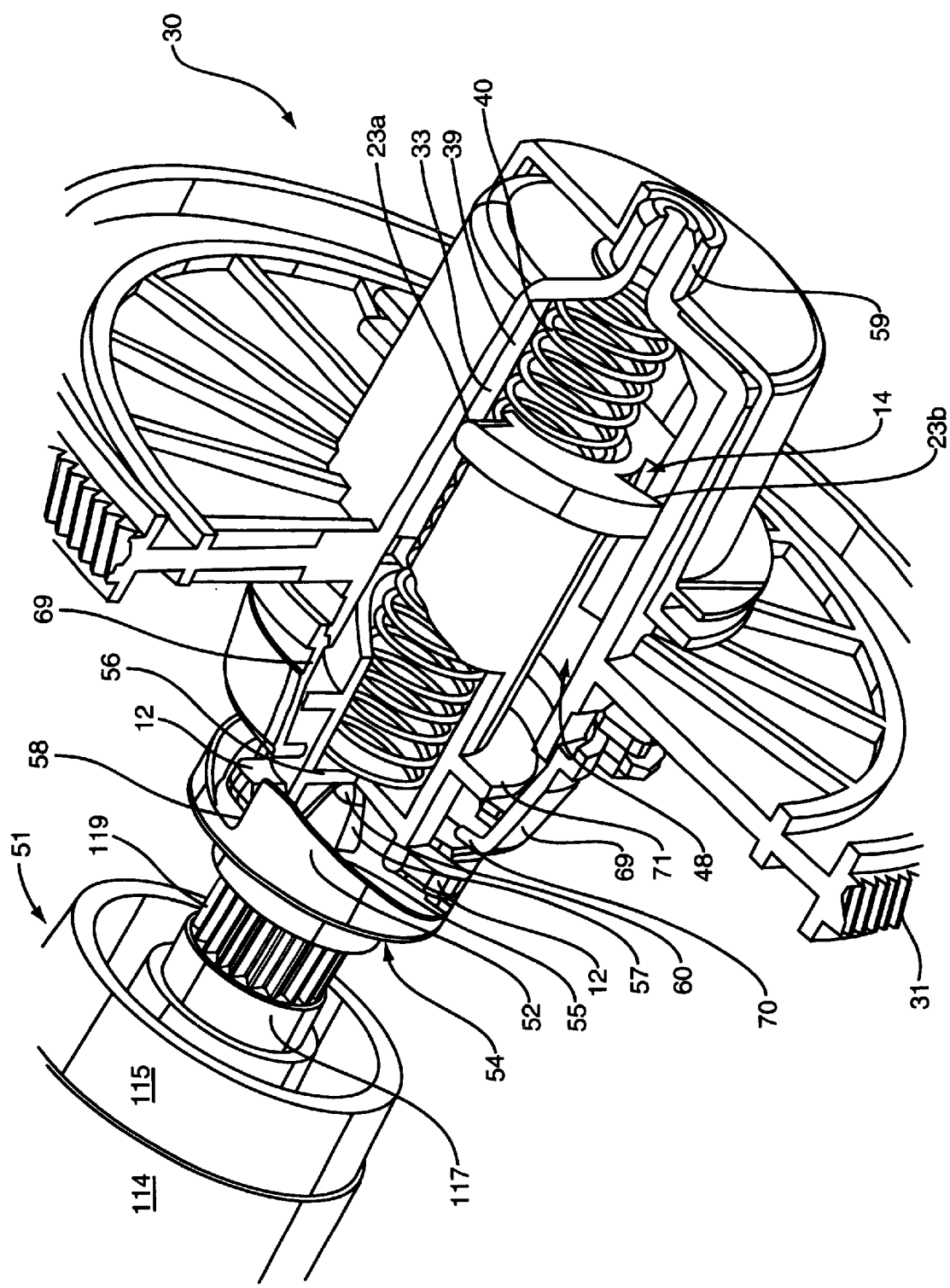
FIG. 4 is a cutaway partial perspective view illustrating one embodiment of a coupler mounted between the image forming device drum drive gear and the drum.

Referring to FIGS. 2 and 3, coupler 10 includes a cylindrical body portion 11 having a first end with extension flanges 17 forming openings 14 including drive surfaces 23a, 23b that contact drive surfaces 33 on drive gear ridges 39. A second end includes prongs 12 extending outward with drive surfaces 21 for contacting drive surfaces 58 on the drum drive assembly 51. One embodiment of the coupler 10 extending between the drum drive assembly 51 and drive gear 30 is illustrated in FIG. 4.

The extension flanges 17 extend substantially radially outward from the body portion 11. In one embodiment, the extension flanges 17 form three openings 14 equally spaced about the coupler first end. However, the present invention is also understood to include any number of openings 14 for mating with an image forming device drive gear 30. The openings 14 are formed within the extension flanges 17 and preferably include rounded drive surfaces 23a, 23b. When the coupler 10 is in use, only one drive surface per opening, 23a or 23b, contacts the ridge 39 of the drive gear. By way of example, drive surface 23a contacts the ridge drive surface 33. The second edge 23b works in combination with drive surface 23a to maintain the coupler position within the drive gear at times when no drum 114 is present or no drive torque is being transmitted such as when the image forming device 100 is idle. The flange portions 17 between any two openings 14 prevent the first end of the coupler from translating radially from the center of the gear causing the opening 14 to no longer straddle the corresponding ridge 39.

FIG. 3 illustrates the prongs 12 extending substantially radially outward from the body portion 11. It will be understood that the present invention preferably includes three prongs 12 extending outward to contact the drum, but other numbers of prongs may also be used. Prongs 12 include a rounded front drive surface 21 for contacting the drum drive subassembly 51. By way of example as illustrated in FIG. 4, drive surfaces 21 contact the drive surfaces 58 of the drum gear coupling member 54.

The radius of curvature of the rounded drive surfaces 21 and 23a provides for rotational accuracy and durability. When the curvature is shallow, such as with a large radius of curvature, the deflection where the rounded drive surfaces 21, 23a contact the drum drive assembly 51 and drive gear 30 is small. Additionally, wear between the drive surfaces 21, 23a and the drum drive assembly 51 and drive gear 30 is reduced. However, the spatial position of the center of curvature of the surfaces is difficult to ascertain on a shallow curvature. For transmission accuracy, it is important that the centers of curvature of the three prong drive surfaces 21 should lie in a plane that is parallel or substantially parallel to a similar plane defined by the three surfaces 23a of the flanges 17. Thus, a coupler 10 with shallow surfaces 21, 23a might provide more stiffness, but be kinematically less precise. Alternatively, a coupler 10 with sharper edges 21, 23a having a smaller radius of curvature would be better kinematically, but have less stiffness. Therefore, the radius of curvature for the surfaces 21, 23a should be determined by the expected variation in the torque necessary to drive the drum 114 and the ability to precisely make surfaces 21, 23a. In one embodiment, driving surface 23a provides for transmitting the rotational accuracy between the drive gear 30 and drum drive assembly 51, therefore edges 23b are rounded similar to adjacent edge 23a but their exact shape is less important.

In one embodiment, each end of the coupler 10 has three contact surfaces 21 and 23a respectively. With three surfaces there are exactly enough kinematic constraints to allow each end of the coupler 10 to find a unique radial position in relation to its mate, either the drive gear 30 or the drum drive assembly 51, while also assuring that the torque being transmitted is evenly divided among each of the three surfaces. This holds true even if the parts are not manufactured with extreme accuracy. If only two prongs were used, no unique radial relationship could be established between drum drive assembly 51 and drive gear 30 without some additional mechanism or device being required, even though each of the two prongs would still share equally in transmitting torque. If more than three prongs were used, only parts made with extreme accuracy would be able to assure that all prongs participated in transmitting equal portions of the torque. Parts made with lesser precision, such as might be found in a low cost consumer product, would probably only end up transmitting significant portions of the torque through any three of the actual prongs. However, it will be understood that the scope of the present invention provides for placing any number of contact points at each coupler end.

Figure 7:
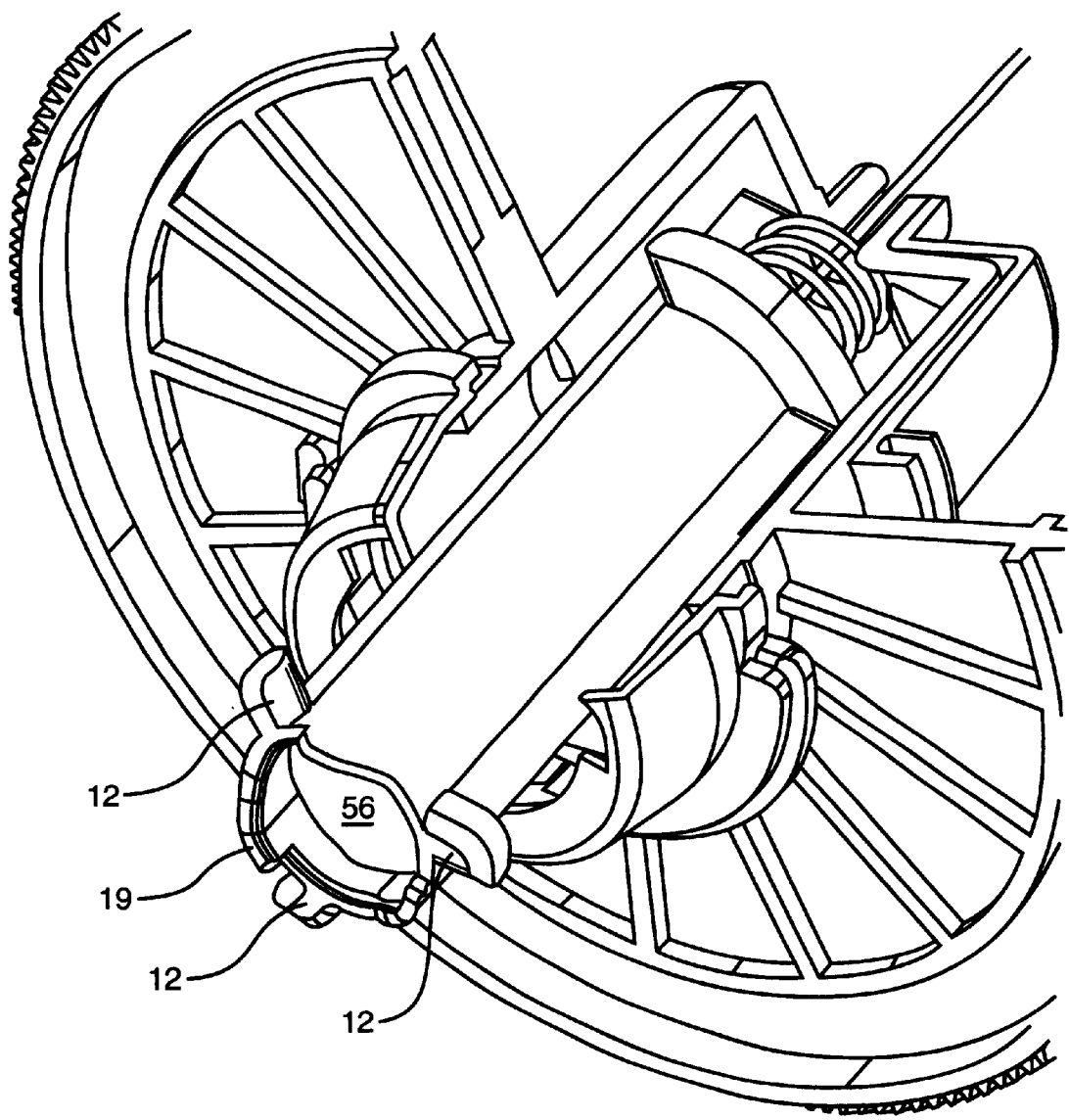
FIG. 7 is a partial perspective view illustrated one end of the coupler.

The coupler edge 19 adjacent the prongs 12 assists in aligning the coupler 10 relative to the drum drive assembly 51 when the cartridge 110 is initially inserted into the image forming apparatus 100. At that time, the drum axis may not align with the second end of the coupler. As a result, the coupler edge 19 may abut against dome 57 extending outward from the drum coupling member 54. When the coupler 10 is initially rotated, edge 19 moves across the dome 57 aligning the wall 56 over the dome 57. The coupler edge 19 may have a variety of orientations including a substantially flat edge as illustrated in FIG. 3, or a contoured edge as illustrated in FIG. 7. The coupler edge 19 may extend beyond a plane formed by the three prongs 12, may be spaced even with the plane formed by the prongs 12, or a combination having sections extending beyond and sections being substantially even with the plane. Once the coupler 10 is fully engaged with the drum drive assembly 51, dome 57 positions the coupler 10 axially between the drive gear 30 and the drum coupling member 54 by presenting dome spherical surface 60 to be contacted by wall 56 under the influence of biasing member 40.

The center 20 of the coupler 10 is preferably hollow. The hollow design provides for maximizing torsional stiffness for a given amount of material. The hollow design also provides for less material to make the coupler 10 resulting in less weight and material cost. A thin-walled construction results in fast heat removal from the coupler when it is die cast from zinc. Wall 56 extends across the hollow center to provide a contact surface for a biasing member 40 and the spherical surface 60 on dome 57.

The axis of rotation of the coupler 10 may not align and be parallel to the axis of rotation of the drum 114. Consequently there will be small periodic axial movement between surfaces 21 and 58 and between surfaces 23a and 33. Because of friction, axial forces are created of magnitude proportional to the torque being transmitted and a coefficient of friction. At each contact area these forces may be in a direction to separate or pull together the coupler 10 and the drum 114. A biasing member 40 pushes wall 56 against surface 60 to prevent separating movement from actually occurring. The hollow coupler design provides for a biasing member 40 to be mounted within the center for forcing the coupler 10 outward from the image forming device 100. The force exerted by the biasing member 40 is preferably within a defined range. The force must be enough to prevent the coupler 10 from backing away from the drum 114 during operation. However, the biasing force tends to interfere with cartridge 110 installation because the act of inserting the cartridge 110 compresses the biasing member 40 requiring the person installing the cartridge to supply force. Therefore, the force exerted by the biasing member 40 should be adequate to provide that the coupler 10 does not back away from the drum 114, but is not too great for installing the cartridge 110. In one embodiment, the inside edge of the coupler 10 is tapered to center the biasing member 40 within the coupler. In one embodiment, the biasing member 40 is a spring.

FIG. 4 illustrates the coupler 10 positioned between the image forming device drive gear 30 and the drum drive assembly 51. The drum drive assembly 51 is attached to the end of drum 114. An end cap 115, drum journal 117, and spline 119 are attached to and extend outward from the drum 114. Drum coupling member 54 is pressed fit onto the spline 119 and includes an outer wall 52 preferably having three ramped edges 55 and drive surfaces 58 for receiving the coupler prongs 12. The dome 57 with spherical surface 60 is positioned in the center of the coupling member 54 for contacting the coupler wall 56. FIG. 6 illustrates the rear of the cartridge having the drum drive gear 51 with outer wall 52, and dome 57 with spherical surface 60 extending outward for receiving the coupler 10.

The drive gear 30 includes gear teeth 31 for intermeshing with the printer drive train along the outside of the circular gear wheel. The large diameter of the drive gear 30 provides for increased rotary accuracy that can be transferred to the drum 114. A cavity 48 is centered in the drive gear 30 and includes ridges 39 axially extending along the cavity 48 having driving surfaces 33 that are contacted by the coupler drive surfaces 23a, 23b. In one embodiment, ridges 39 have a long axial extent to provide for axial locating tolerances between the drum drive assembly 51 and coupler 10. Additionally, when the cartridge 110 is installed, prongs 12 may abut against the edge of the outer wall 52 and do not seat into the drum coupling member 54 against the drive surfaces 58 until rotation. As a result, the coupler 10 must be able to be pushed deeper axially into the cavity 48 to allow for cartridge insertion.

A bushing 59 is positioned within the image forming apparatus for mounting the drive gear 30. A bushing 69 may extend around the front of the drive gear 30 and include a retainer flange 70. In one embodiment, coupler 10 includes a fin 71 extending outward about the coupler circumference for contacting the retainer flange 70 to maintain the coupler. When the cartridge 110 is removed from the image forming apparatus 100, the biasing member 40 pushes the coupler 10 outward and the retainer flange 70 contacts the fin 71 to hold the coupler 10 within the drive gear 30.

In use, the coupler wall 56 is pushed by the biasing member 40 against the spherical surface 60 of dome 57. The contact between the surface 60 and the wall 56 positions the coupler 10 between the drum drive assembly 51 and the drive gear 30 and also provides for maintaining accurate rotary motion when the axis of the drive gear 30 and the drum 114 are not aligned. As the coupler 10 is rotated, the rounded prong drive surfaces 12 contact the ramped edges 55 until they seat against the drive surfaces 58.

Figure 5:
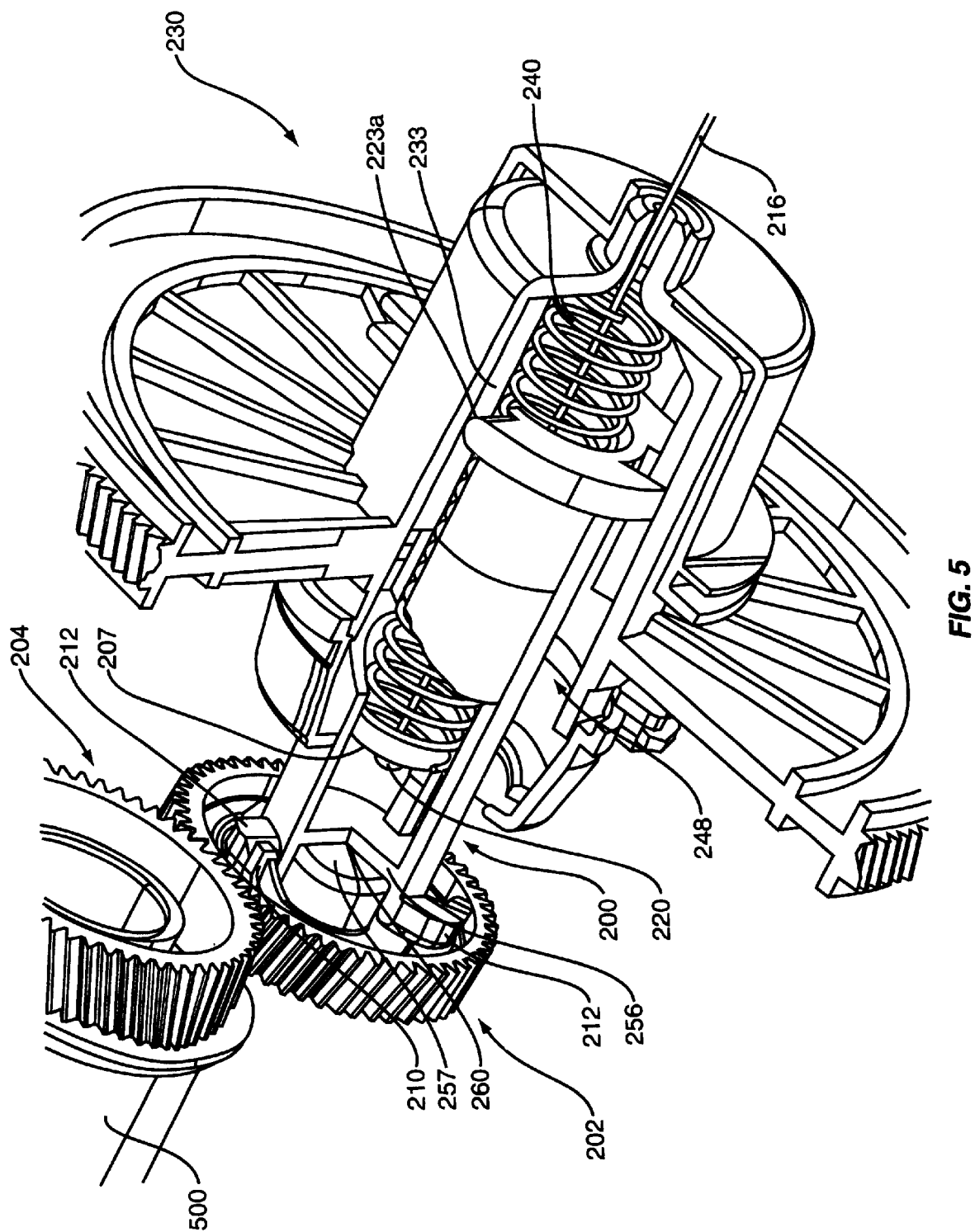
FIG. 5 is a cutaway perspective view illustrating another embodiment of the coupler extending between a drive gear within the image forming apparatus and the ITM mechanism drive gears.

FIG. 5 illustrates another embodiment of a coupler 200 for transferring rotary motion to ITM belt gears. Coupler 200 is shaped as previously defined including a first end having flanges with rounded drive edges 223a that seat against ridges 233 within the drive gear 230. A second end of the coupler includes prongs 212 with rounded drive surfaces that contact projections 210 on an ITM gear 202. Teeth 202 on the outer diameter of the ITM gear mate with teeth 204 on a second gear for driving the ITM belt 500.

In one embodiment, drive gear 230 includes a cavity 248 for maintaining the coupler 200. As with the previous embodiment, the coupler 200 has a hollow interior for positioning a biasing member 240. The biasing member forces a central wall 256 against a spherical surface 260 on dome 257 on the ITM gear 202. A retraction cord 216 extends from the image forming device into the interior of the coupler 200. A clip 207 is pressed into the hollow interior of the coupler. Cord 216 passes through a hole in the clip 207, and a ball 220 is attached to the end of the cord. A mechanism (not illustrated) pulls cord 216 to retract the coupler 200 away from the ITM gear 202. Such a retraction mechanism is necessary because in some image forming apparatus, the direction of removal or installation of this module is at a right angle to the axes of rotation of gears 230 and 202 unlike the previous embodiment in which the cartridge and drum are removed and installed axially.

In the foregoing description, like-reference characters designate like or corresponding parts throughout the several views. Also, it is to be understood that such terms as "forward", "rearward", "left", "right", "upward", and "downward", and the like are words of convenience that are not to be construed as limiting terms. Certain modifications and improvements will occur to those skilled in the art upon a reading of the foregoing description. By way of example, the retention cord may be used for retracting the coupler within the drive gear for either the ITM belt application, or the photoconductive drum application. Likewise, the retention flange may also be used for either application. Additionally, the coupler 10 may connect directly to a drive gear as illustrated in FIG. 4, or indirectly through other gears or mechanisms as illustrated in FIG. 5 to transfer rotary motion. It should be understood that all such modifications and improvements have been deleted herein for the sake of conciseness and readability but are properly within the scope of the following claims.

What is claimed is:

1. A coupler to translate angular motion from a drive gear of an image forming apparatus to a drum, the coupler comprising:
   a body having a first end and a second end;
   a plurality of flanges radially extending from said body first end and being spaced a distance apart to form three spaced openings; and
   three prongs radially extending from and evenly spaced about said second end.

2. The apparatus of claim 1, wherein said body has a hollow interior section, the apparatus further including a biasing member positioned within said hollow interior section and being adapted to bias the coupler between the drive gear and the drum.

3. The apparatus of claim 1, wherein each of said prongs and said openings includes at least one rounded driving surface for contacting the drive gear and the drum.

4. The apparatus of claim 1, further including a coupler edge positioned at one of said coupler first and second ends, said coupler edge comprising a contoured edge for mating with one of the drive gear and the drum.

5. An image forming apparatus comprising:
   a main image forming body having a drive gear, said drive gear having a plurality of ridges;
   a photoconductive drum having a drum drive assembly mounted thereto, said photoconductive drum mounted within the image forming apparatus with said drum drive assembly positioned adjacent to said drive gear ridges;
   a coupler extending between said main image forming body and said photoconductive drum, said coupler having a plurality of extensions extending outwardly from a first end for mating with said plurality of ridges of said drive gear, said coupler having a second end with a plurality of extensions extending outwardly therefrom to mate with said drum drive assembly, said coupler transmitting angular motion of said drive gear to said photoconductive drum.

6. The apparatus of claim 5, wherein said drum drive assembly comprises a drum gear coupling member having a plurality of ramped edges and drive surfaces to contact said plurality of extensions on said coupler second end.

7. The apparatus of claim 6, wherein said drum gear coupling member includes an outwardly extending dome for contacting said coupler and spacing said coupler between said drum drive assembly and said drive gear.

8. The apparatus of claim 7, wherein said coupler further includes a contoured edge extending around an outer circumference of said second end, wherein contact between said contoured edge and said drum drive assembly aligns said plurality of extensions on said coupler second end with said drum gear coupling member drive surfaces.

9. The apparatus of claim 5, wherein said drive gear ridges are axially aligned within an opening, and said coupler first end extensions form openings sized to straddle said ridges.

10. The apparatus of claim 9, wherein at least one side of said openings comprises a rounded drive surface that contact said ridges.

11. The apparatus of claim 5, wherein said coupler is positioned within an opening within said drive gear, said opening further comprises a retainer bushing extending into said opening to maintain said coupler mounted to said ridges.

12. The apparatus of claim 5, further comprising a biasing member positioned between said drive gear and said coupler to bias said coupler outward from said main image forming body.

13. The apparatus of claim 5, wherein three extensions extend outward from each of said coupler first and second ends.

14. The apparatus of claim 5, further including a retention cord having a first end connected to said main image forming body and a second end attached to said coupler, said retention cord maintaining said coupler within said drive gear.

15. An image forming apparatus comprising:
at least one drive gear having a circular gear wheel and an opening within said gear wheel, said opening having a plurality of ridges extending substantially perpendicular to said circular gear wheel;
a drum drive assembly operatively connected to each of at least one photoconductive drum within the image forming apparatus, said drum drive assembly having a plurality of drive surfaces and a dome extending outward therefrom;
a coupler extending between a main image forming body and said drum drive assembly, said coupler having a plurality of drive surfaces extending from a first end to contact said plurality of ridges of said gear wheel, said coupler having a plurality of drive surfaces extending from a second end to contact said drive assembly drive surfaces, said coupler further comprising a wall extending adjacent to said second end to contact said dome.

16. The apparatus of claim 15, further including a biasing member for positioning said coupler wall against said dome.

17. The apparatus of claim 15, further including a retention cord mounted to said coupler for maintaining said coupler within said drive gear.

18. The apparatus of claim 15, wherein said drum drive assembly comprises a drum gear coupling member having an outer wall comprising a plurality of ramped surfaces leading into said plurality of drive surfaces of said drum drive assembly.

19. The apparatus of claim 15, wherein said drum drive assembly comprises three prongs extending outward therefrom for mating with said coupler second end drive surfaces.

20. An image forming apparatus comprising:
an image forming body having a drive gear, said drive gear having a plurality of ridges;
at least one intermediate transfer medium (ITM) belt gear, said ITM belt gear having a plurality of driving surfaces and a dome extending outward therefrom; and
a coupler extending between said image forming body and said ITM belt gear, said coupler having a plurality of extensions extending outwardly from a first end for mating with said plurality of ridges of said image forming body drive gear, said coupler having a second end with a plurality of extensions extending outwardly therefrom to mate with said ITM belt gear driving surfaces, said coupler having a wall positioned proximate to said second end for contacting said dome.

21. The apparatus of claim 20, further including a biasing member to bias said coupler wall against said dome.

22. The apparatus of claim 20, wherein said at least one ITM belt gear comprises a first drive gear for mating with said coupler, and a second drive gear operatively connected to said first drive gear for rotating an ITM belt, wherein said coupler transmits angular motion of said image forming body drive gear to said ITM belt.

23. A method of transmitting the angular motion of drive gears to a photoconductive drum of an image forming apparatus, said method comprising the steps of:
a) mounting a first end of a coupler within a drive gear of the image forming apparatus, the coupler having a plurality of openings sized to straddle ridges within the drive gear;
b) positioning a coupler wall against a dome of a drive member;
c) rotating the drive gear and the coupler; and
d) seating a plurality of extensions positioned on a second end of said coupler against drive surfaces on said drive member.

24. The method of claim 23, wherein the step of positioning the coupler wall against said dome of they drive member comprises biasing the coupler with a biasing member.

* * * * *